United States Patent [19]

Sasaki et al.

[11] Patent Number: 4,754,051

[45] Date of Patent: Jun. 28, 1988

[54] OPTICALLY ACTIVE TOLAN DERIVATIVE

[75] Inventors: Makoto Sasaki, Urawa; Kiyohumi Takeuchi, Toyko; Haruyoshi Takatsu, Kodaira, all of Japan

[73] Assignee: Dainippon Ink and Chemicals, Inc., Tokyo, Japan

[21] Appl. No.: 912,474

[22] Filed: Sep. 29, 1986

[30] Foreign Application Priority Data

Sep. 30, 1985 [JP] Japan ............................ 60-217505
Jan. 9, 1986 [JP] Japan ................................ 61-2634

[51] Int. Cl.$^4$ ................... C09K 19/06; C09K 19/52; C09K 19/20; C07C 69/76
[52] U.S. Cl. ........................... 560/8; 560/64; 560/72; 252/299.64; 252/299.01; 252/299.6
[58] Field of Search .......... 252/299.6, 299.64, 299.67, 252/299.01; 350/350 R, 350 S; 560/8, 64, 72

[56] References Cited

U.S. PATENT DOCUMENTS

| 4,576,732 | 3/1986 | Isogai et al. | 252/299.65 |
| 4,592,858 | 6/1986 | Higuchi et al. | 252/299.66 |
| 4,705,870 | 11/1987 | Takatsu et al. | 252/299.6 |
| 4,705,905 | 11/1987 | Takatsu et al. | 252/299.6 |
| 4,713,468 | 12/1987 | Takatsu et al. | 252/299.6 |

FOREIGN PATENT DOCUMENTS

| 2309501 | 2/1973 | Fed. Rep. of Germany | 252/299.6 |
| 2644219 | 9/1976 | Fed. Rep. of Germany | 252/299.6 |
| 2155465 | 9/1985 | United Kingdom | 252/299.6 |

OTHER PUBLICATIONS

Dubois et al., Mol. Cryst. Liq. Cryst., vol. 27, pp. 187-198 (1974).
Malthete et al., Mol. Cryst. Liq. Cryst., vol. 23, pp. 233-260 (1973).
Gray et al., Liquid Crystals & Plastic Crystals, vol. 1, pp. 142-143, 170-171 (1974).
Demus et al., ed., Flussige Kristalle in Tabellen, pp. 52-55 (1974).
Chemical Abstracts, vol. 87, No. 3, Jul. 18, 1977, 22693(b).
Chemical Abstracts, vol. 76, No. 7, Feb. 14, 1972, 34379(q).
Chemical Abstracts, vol. 82, No. 11, Mar. 17, 1975, 73031(k).

Primary Examiner—Teddy S. Gron
Assistant Examiner—J. E. Thomas
Attorney, Agent, or Firm—Armstrong, Nikaido, Marmelstein & Kubovcik

[57] ABSTRACT

A novel optically active compound of the formula

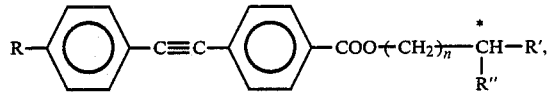

is capable of forming a chiral nematic liquid crystal composition having short spiral pitch by adding a small amount of it to a generally nematic liquid crystal composition. The compound of this invention is useful in the manufacture of SBE display device which is excellent especially in high level multiplexing driving system.

5 Claims, 1 Drawing Sheet

OPTICALLY ACTIVE TOLAN DERIVATIVE

FIELD OF THE INVENTION

This invention relates to a novel optically active tolan derivative which is useful as an electrooptical display material.

BACKGROUND OF THE INVENTION

At present, as the means of preventing the generation of reverse domain in the TN type (Twisted Nematic) liquid crystal display device, it is usually preferred to use a process wherein about 0.1% of a cholesteric liquid crystal or about 0.1 to 1% of an optically active compound is added to a nematic liquid crystal composition.

The SBE (Supertwisted Birefringence Effect) display device which was recently proposed by T. J. Scheffer et al. [Applied Physics Letters, 45, 1021–1023 (1984)] is excellent especially in high level multiplexing driving system and adapted for a flat panel. The nematic liquid crystals in the SBE display device are those which have been twisted at an angle of 180° to 270° by the addition of an optically active compound. For this purpose, an optically active dextro or laevo compound which can afford short spiral pitch by its addition in an amount as small as possible is required.

SUMMARY OF THE INVENTION

The object of this invention is to provide a novel optically active compound which can form a chiral nematic liquid crystal composition having short spiral pitch when a small amount thereof is added to a nematic liquid crystal composition.

This invention could solve the foregoing problem by providing the compound represented by the following general formula:

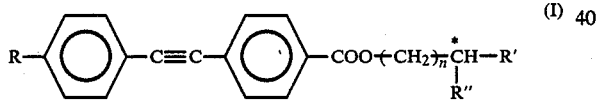

(I)

wherein R represents a straight chain alkyl group having 1 to 20 carbon atoms, an alkoxyl group or

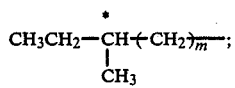

R' represents a straight chain alkyl group having 2 to 8 carbon atoms or phenyl group; and R" represents a straight chain alkyl group having 1 to 5 carbon atoms, provided that R' and R" are different groups; n represents 0 or 1; m represents an integer of 1 to 4; and $\overset{*}{C}$ represents an assymmetric carbon atom.

DETAILED DESCRIPTION OF THE INVENTION

Figure 2:
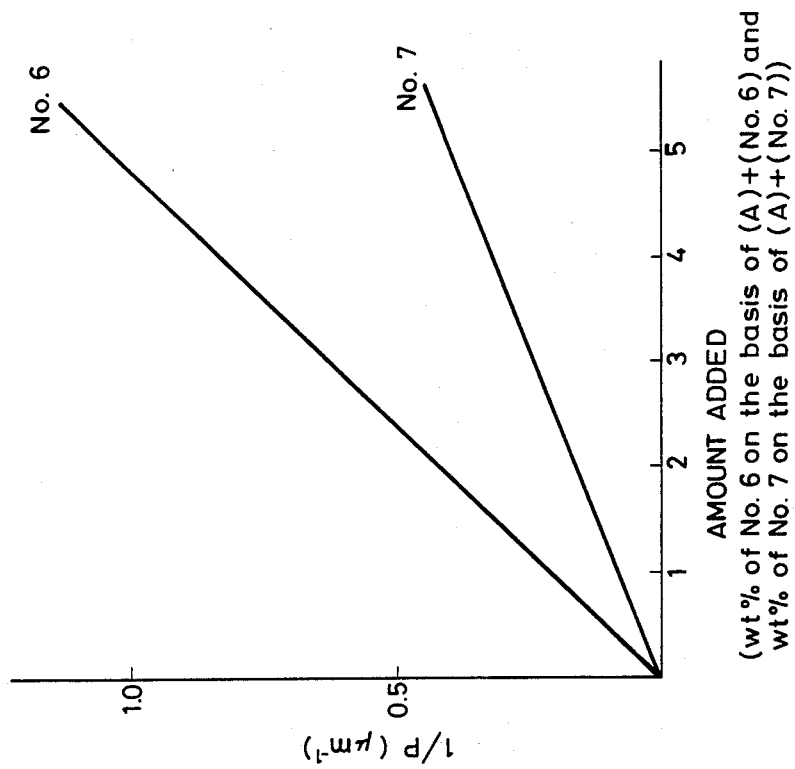
FIGS. 1 and 2 indicate the relationship between the amount added of the compounds of this invention (wt% based on the total weight) and the reciprocal (l/p) of the spiral pitch p of the liquid crystals obtained when the compounds of this invention Nos. 1 to 5 and Nos. 6 to 7 are added respectively in varying proportions to the host liquid crystal (A) which is now widely used as a nematic liquid crystal material.

One example of the process for preparation of the compound represented by the general formula (I) will be explained below.

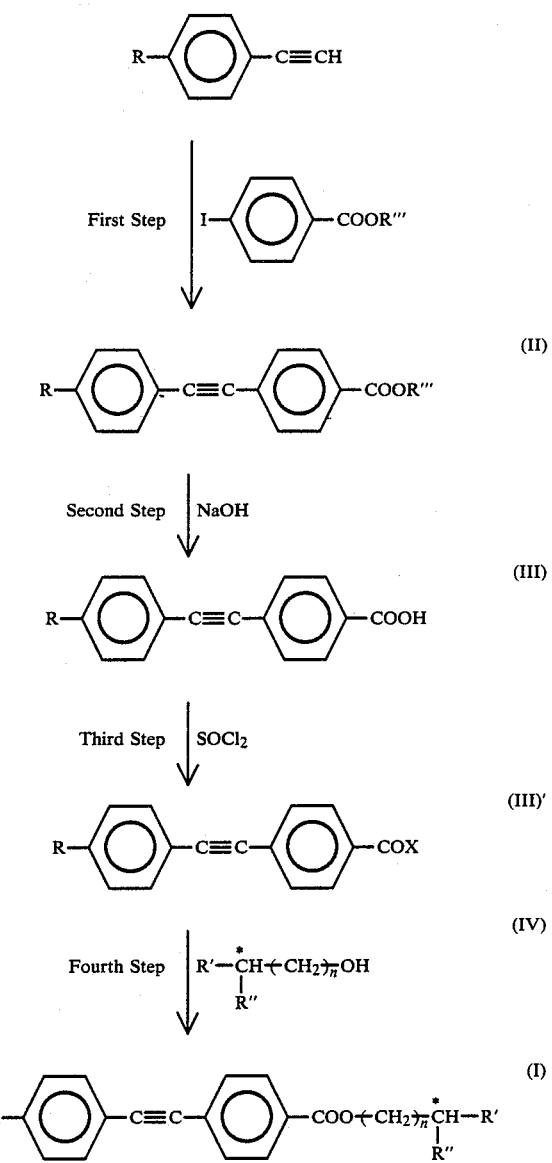

In the reaction scheme, R, R' and R" are as defined above, and R''' represents alkyl group.

First Step:

4-Alkylphenylacetylene or 4-alkoxyphenylacetylene is reacted with 4-iodobenzoic acid ester in a solvent such as diethylamine in the presence of a catalyst such as bis(triphenylphosphine)palladium (II) chloride to produce a compound of formula (II).

Second Step:

The compound of formula (II) produced in the first step is reacted with a base such as sodium hydroxide in a solvent such as ethanol to produce a compound of formula (III).

Third Step:

The compound of formula (III) produced in the second step is reacted with a halogenating agent to produce a compound of formula (III)': X in the compound of formula (III)' is preferably chlorine atom, wherein thionyl chloride may be preferably used as the halogenating agent. The reaction is carried out under the ordinary pressure at the reflux temperature of the reaction mixture. It is not necessary to isolate the compound of formula (III)' from the mixture formed in the reaction, while it is required to simply remove an excess halogenating agent.

Fourth Step:

The crude compound of formula (III)' produced in the third step is reacted with an optically active alcohol of formula (IV) in a basic solvent such as pyridine. By subjecting the reaction product to purification treatments such as solvent extraction, water washing, drying, recrystallization, etc. the final product of formula (I) can be isolated.

The transition temperature and the optical rotation of the typical compounds of formula (I) thus produced are shown in Table 1.

stituted phenyl 4'-(4''-substituted cyclohexanecarbonyloxy)benzoates, 4-substituted phenyl 4'-(4''-substituted cyclohexyl)benzoates, 4-substituted cyclohexyl 4'-(4''-substituted cyclohexyl)benzoates, 4-substituted 4'-substituted biphenyls, 4-substituted phenyl 4'-substituted cyclohexanes, 4-substituted 4'-substituted terphenyls, 4-substituted biphenyl 4'-substituted cyclohexanes, and 2-(4'-substituted phenyl)-5-substituted pyrimidines, etc.

In addition, the host liquid crystal (a) comprises

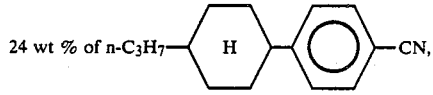

24 wt % of n-C$_3$H$_7$

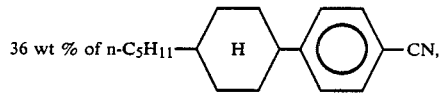

36 wt % of n-C$_5$H$_{11}$

TABLE 1

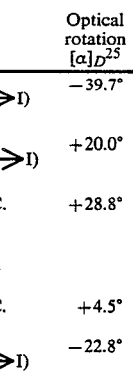

| No. | R | R' | R'' | n | Transition temperature | Optical rotation $[\alpha]_D^{25}$ |
|---|---|---|---|---|---|---|
| 1 | n-C$_5$H$_{11}$— | n-C$_6$H$_{13}$— | CH$_3$— | 0 | 35° C. (C ⟶ I) | −39.7° |
| 2 | n-C$_5$H$_{11}$— | C$_2$H$_5$— | CH$_3$— | 0 | −2° C. (C ⟶ I) | +20.0° |
| 3 | CH$_3$CH$_2$$\overset{*}{\underset{\mid}{C}}$HCH$_2$CH$_2$—<br>(CH$_3$) | C$_2$H$_5$— | CH$_3$— | 0 | liquid at −60° C. | +28.8° |
| 4 | n-C$_5$H$_{11}$— | C$_2$H$_5$— | CH$_3$— | 1 | liquid at −60° C. | +4.5° |
| 5 | n-C$_5$H$_{11}$— | C$_2$H$_5$— | CH$_3$— | 0 | 15° C. (C ⟶ I)<br>−2° C. (I ⇌ Ch) | −22.8° |
| 6 | n-C$_5$H$_{11}$— | (phenyl) | CH$_3$— | 0 | 73° C. (C ⟶ I) | −101.7° |
| 7 | n-C$_5$H$_{11}$— | (phenyl) | CH$_3$— | I | 36° C. (C ⟶ I)<br>30° C. (Ch ⇌ I) | +44.5° |

(In the above Table 1, C represents crystalline phase, Ch represents cholesteric phase, and I represents isotropic liquid phase. The same shall be applied hereinafter.)

The compound of formula (I) can be used in admixture with the ordinary nematic liquid crystal mixture. Preferable examples which can be used in admixture with the comound of formula (I) include 4-substituted phenyl 4'-substituted benzoates, 4-substituted phenyl 4'-substituted cyclohexanecarboxylates, 4-substituted biphenyl 4'-substituted cyclohexanecarboxylates, 4-sub-

25 wt % of n-C$_7$H$_{15}$ ... CN, and 15 wt % of n-C₅H₁₁ 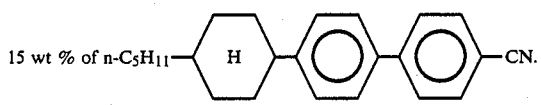 CN.

Figure 1:
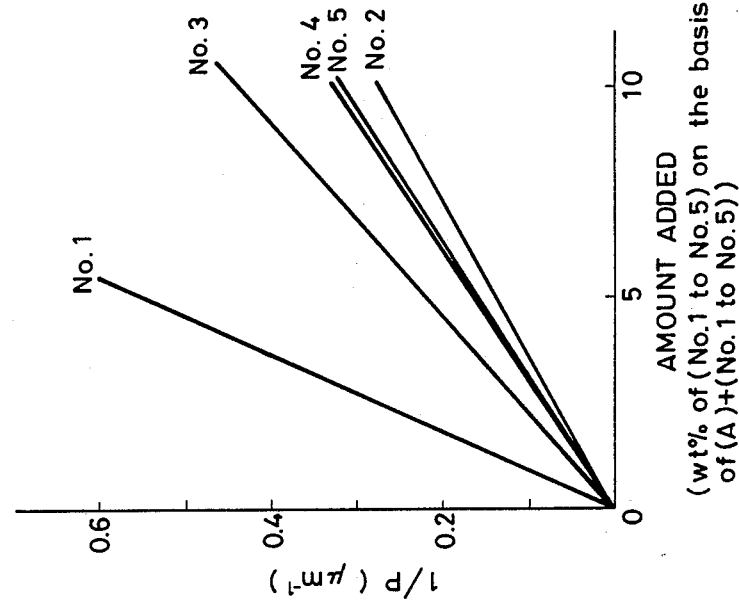

From FIGS. 1 and 2 it is found that the compound of formula (I) can form nematic liquid crystal compositions, whose l/p values have rapidly increased, that is, chiral nematic liquid crystal compositions, which have short spiral pitch may be prepared, by adding a small amount thereof to the host nematic liquid crystal.

Also, the compound of formula (I) can produce a ferroelectric liquid crystal composition by adding it to or mixing it with a liquid crystal compound having a chiral smectic crystalline phase (Sc*).

EXAMPLE 1

26 g (0.1 mol) of 4-iodobenzoic acid methyl ester was dissolved in 30 ml of diethylamine, and after addition of 0.21 g (0.0003 mol) of bis(triphenylphosphine)palladium (II) chloride and 0.19 g (0.001 mol) of cuprous iodide, 17.2 g (0.1 mol) of 4-n-pentylphenylacetylene was dropwise added to the resulting solution at room temperature. After the dropping was complete, stirring was continued for 7 hours at room temperature. After the reaction was completed, the reaction liquid was added to an excess of ice-cooled hydrochloric acid. The crystals deposited were recovered by filtration, washed with water until neutral, and then purified by recrystallization from ethanol, whereby 25 g (0.08 mol) of the following compound was obtained.

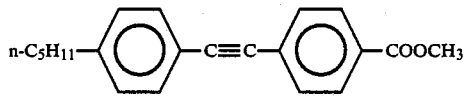

The compound was added to a mixture of 300 ml of ethanol and 100 ml of water, and after addition of 13 g (0.3 mol) of sodium hydroxide thereto, the resulting solution was heat refluxed for 3 hours. After the reaction was completed the reaction liquid was added to an excess of ice-cooled hydrochloric acid. The crystals deposited were recovered by filtration, washed with water until neutral, and purified by recrystallization from chloroform, whereby 20 g (0.07 mol) of the following compound was obtained

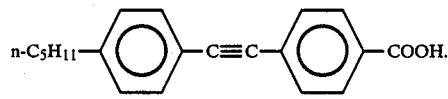

2.9 g (0.01 mol) of this compound was added to an excess of thionyl chloride, and after three hours of heat refluxing the excess thionyl chloride was distilled off under reduced pressure. The compound thus obtained was dissolved in 15 ml of pyridine, and after addition of 0.8 g (0.01 mol) of (S)-(+)-2-butanol, reaction was effected for 1 hour at 50° C. After the reaction was completed, the reaction product was extracted with toluene in an acid state containing hydrochloric acid, washed with water, dried, and recrystallized from ethanol, which gave 2.7 g (0.008 mol) of the following compound.

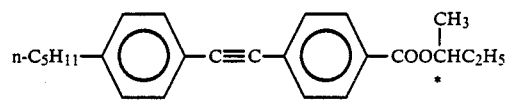

Yield: 80%, $[\alpha]_D^{25} = +20.0°$
Transition temperature: $-2°$ C. (C $\longrightarrow$ I)

EXAMPLE 2

The following compound was obtained in the same manner as in Example 1 except that (R)-(−)-2-butanol was used as the raw material alcohol.

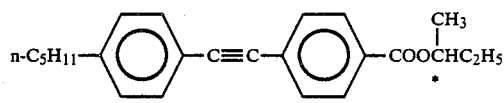

Yield: 74%, $[\alpha]_D^{25} = -22.8°$
Transition temperature: 15° C. (C $\longrightarrow$ I),
$-2°$ C. (I $\rightleftarrows$ Ch)

EXAMPLE 3

The following compound was obtained in the same manner as in Example 1 except that (R)-(−)-2-octanol was used as the raw material alcohol.

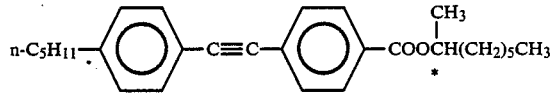

Yield: 77%, $[\alpha]_D^{25} = -39.7°$
Transition temperature: 35° C. (C $\longrightarrow$ I)

EXAMPLE 4

The following compound was obtained in the same manner as in Example 1 except that (S)-(+)-2-methylbutanol was used as the raw material alcohol.

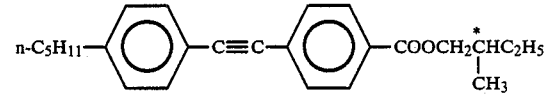

Yield: 78%, $[\alpha]_D^{25} = +4.5°$
Transition temperature: liquid at $-60°$ C.

EXAMPLE 5

The following compound was obtained in the same manner as in Example 1 except that 4-{(S)-(+)-3'-methylamyl}phenylacetylene was used as the raw material 4-alkylphenylacetylene, and (S)-(+)-2-butanol was used as alcohol.

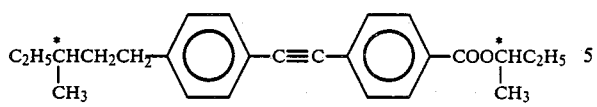

Yield: 63%, $[\alpha]_D^{25} = -22.8°$
Transition temperature: liquid at $-60°$ C.

EXAMPLE 6

15 ml of thionyl chloride was added to 0.94 g (0.0032 mol) of compound of formula:

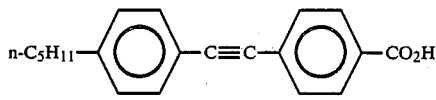

and after the resulting mixture was allowed to react for 30 minutes under reflux, the excess thionyl chloride was distilled off under reduced pressure. To the reaction product thus obtained there were added 0.4 g (0.0032 mol) of compound of formula:

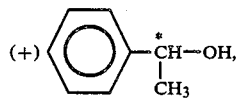

30 cc of toluene, and 1 g of pyridine, and the resulting mixture was allowed to react for 30 minutes under reflux. The reaction liquid was washed with 9% hydrochloric acid and then with water until neutral, after which toluene was distilled off from the reaction liquid under reduced pressure. By recrystallizing the reaction product from ethanol, 0.95 g (0.0024 mol) of the following compound was obtained.

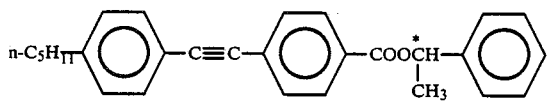

Yield: 76%, $[\alpha]_D^{25} = -101.7°$
Transition temperature: 73° C. (C ⟶ I)

EXAMPLE 7

The following compound was obtained in the similar manner to Example 6.

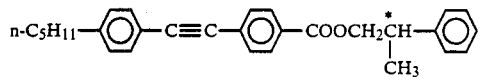

Yield: 72%, $[\alpha]_D^{25} = +44.5°$
Transition temperature: 36° C. (C ⟶ I);
30° C. (I ⇌ Ch)

The compound of the present invention is capable of preparing a chiral nematic liquid crystal composition having short spiral pitch by adding a small amount thereof to a nematic liquid crystal composition. Thus, the compound is effective for forming an SBE display device having excellent property in high level multiplexing driving system.

While the invention has been described in detail and with reference to specific embodiments thereof, it will be apparent to one skilled in the art that various changes and modifications can be made therein without departing from the spirit and scope thereof.

What is claimed is:

1. An optically active tolan derivative represented by the general formula:

wherein R represents a straight chain alkyl group having 1 to 20 carbon atoms, or

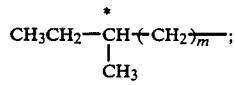

R' represents a straight chain alkyl group having 2 to 8 carbon atoms or phenyl group, and R" represents a methyl group; n represents 0 or 1, m represents an integer of 1 to 4; and C represents an asymmetric carbon atom.

2. The compound as defined in claim 1, wherein R is n—$C_5H_{11}$—, and R' is n—$C_6H_{13}$—.

3. The compound as defined in claim 1, wherein R is n—$C_5H_{11}$—, and R' is $C_2H_5$—.

4. The compound as defined in claim 1, wherein R is

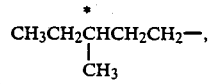

and R' is $C_2H_5$—.

5. The compound as defined in claim 1, wherein R is n—$C_5H_{11}$—, and R' is

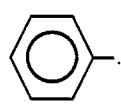

* * * * *